United States Patent
Saksena

(10) Patent No.: US 7,353,821 B2
(45) Date of Patent: Apr. 8, 2008

(54) STEAM OVEN SYSTEM HAVING STEAM GENERATOR WITH CONTROLLED FILL PROCESS

(75) Inventor: Atul Saksena, Troy, OH (US)

(73) Assignee: Premark FEG L.L.C., Wilmington, DE (US)

( * ) Notice: Subject to any disclaimer, the term of this patent is extended or adjusted under 35 U.S.C. 154(b) by 202 days.

(21) Appl. No.: 10/996,703

(22) Filed: Nov. 24, 2004

(65) Prior Publication Data

US 2006/0107943 A1    May 25, 2006

(51) Int. Cl.
*F24D 1/00* (2006.01)
*F24H 1/18* (2006.01)

(52) U.S. Cl. ........................ 126/369; 126/348

(58) Field of Classification Search ............... 126/369, 126/20, 5, 376.1, 33, 369.3, 348; 122/18.1, 122/18.3, 504, 505, 507, 506, 451.1, 451.2, 122/448.1
See application file for complete search history.

(56) References Cited

U.S. PATENT DOCUMENTS

| | | | |
|---|---|---|---|
| 82,557 A | 9/1868 | Savage | |
| 293,048 A | 2/1884 | Maxim | |
| 1,659,806 A | 2/1928 | Calkins | |
| 1,955,289 A | 4/1934 | Greenfield | |
| 2,089,411 A | 8/1937 | Olsson et al. | |
| 2,300,782 A | 11/1942 | Gollmer | |
| 2,385,161 A * | 9/1945 | Pinkerton | 122/451 R |
| 2,428,481 A | 10/1947 | Wagner | |
| 2,530,519 A | 11/1950 | Guggenheim | |
| 2,906,258 A | 9/1959 | Parker | |
| 3,780,705 A | 12/1973 | Le Febve de Vivy | |
| 3,814,901 A | 6/1974 | Morhack | |
| 3,828,738 A | 8/1974 | Frei | |
| 4,173,215 A * | 11/1979 | Bureau et al. | 126/369 |
| 4,242,989 A | 1/1981 | Chamberlain | |
| 4,531,479 A | 7/1985 | Gilbert | |
| 4,582,025 A | 4/1986 | Grasso | |
| 4,617,908 A | 10/1986 | Miller et al. | |
| 4,619,224 A | 10/1986 | Takita et al. | |
| 4,662,390 A * | 5/1987 | Hawkins | 137/392 |
| 5,169,291 A | 12/1992 | Zebuhr | |
| 5,224,445 A * | 7/1993 | Gilbert, Sr. | 122/448.1 |
| 5,355,840 A | 10/1994 | Violi | |
| 5,649,476 A | 7/1997 | Montagnino et al. | |
| 5,739,504 A * | 4/1998 | Lyons et al. | 219/494 |
| 6,055,945 A | 5/2000 | Simoni | |
| 6,131,504 A | 10/2000 | Imamura et al. | |
| 6,237,469 B1 | 5/2001 | Stritzl et al. | |
| RE37,240 E | 6/2001 | Moore, Jr. et al. | |
| 6,289,852 B1 * | 9/2001 | Murgu et al. | 122/448.1 |
| 6,520,122 B2 * | 2/2003 | Kemp et al. | 122/504.2 |
| 6,688,329 B2 | 2/2004 | Murray et al. | |
| 6,911,626 B2 * | 6/2005 | Shozo | 219/401 |
| 2002/0144662 A1 | 10/2002 | Kemp et al. | |

* cited by examiner

*Primary Examiner*—Steve McAllister
*Assistant Examiner*—Chuka Ndubizu
(74) *Attorney, Agent, or Firm*—Thompson Hine.com

(57) ABSTRACT

A steam oven includes a heating chamber or boiler in which steam is generated. Water fill and refill operations of the heating chamber are controlled in attempt to account for water expansion and/or to enable substantially regular production of steam.

16 Claims, 2 Drawing Sheets

STEAM OVEN SYSTEM HAVING STEAM GENERATOR WITH CONTROLLED FILL PROCESS

TECHNICAL FIELD

The present application relates generally to steam ovens used to steam food products, and more particularly to a steam oven including a low pressure steam generator with a controlled fill process.

BACKGROUND

Steam cookers have been successfully employed by restaurants, hospitals and other food service operations to prepare quickly and conveniently large quantities of food. Many such cookers are used in high volume situations. It is desirable to provide steamers with reduced maintenance requirements. It is also desirable to provide steamers that have the ability to produce steam on a relatively uninterrupted basis.

SUMMARY

In one aspect, a steam cooker includes a heating chamber defining a volume for holding water, the heating chamber including a water inlet and a steam outlet, a heating unit associated with the heating chamber in order to heat water in the heating chamber so as to generate steam and a steam path from the steam outlet to a steam cooking chamber. A heating chamber control system is associated with the heating chamber for controlling water filling and heating operations of the heating chamber. During an initial fill operation of the heating chamber the heating chamber control system operates such that water flow into the heating chamber is at least temporarily stopped or restricted based at least in part upon temperature of the water in the chamber.

In another aspect, a steam cooker includes a heating chamber control system associated with the heating chamber for controlling water filling and heating operations of the heating chamber. During normal steaming operations water level varies between a higher level and a lower level in accordance with steam exiting the heating chamber and replacement water being added back to the heating chamber. During an initial fill operation of the heating chamber the heating chamber control system operates to control water flow into the tank and heating of the water so that a substantial majority of water volume expansion due to temperature increase occurs prior to water level in the tank reaching the higher level.

In a further aspect, a steam cooker includes a heating chamber control system associated with the heating chamber for controlling water filling and heating operations of the heating chamber. During normal steaming operations water level varies between a higher level and a lower level in accordance with steam exiting the heating chamber and replacement water being added back to the heating chamber. During an initial fill operation of the heating chamber the heating chamber control system operates to control water flow into the tank and heating of the water so that when the water level initially reaches the higher level a temperature of the water is at least 190° F.

In another aspect, a steam cooker includes a heating chamber defining a volume for holding water, the heating chamber including a water inlet and a steam outlet. A heating unit is associated with the heating chamber in order to heat water in the heating chamber so as to generate steam. A steam path leads from the steam outlet to a steam cooking chamber. A heating chamber control system is associated with the heating chamber for controlling water filling and heating operations of the heating chamber in reference to a first water level, a second water level and a third water level, the second water level above the first water level and below the third water level. During an initial fill operation of the heating chamber the heating chamber control system operates such that water flow into the heating chamber is at least temporarily stopped or restricted when the water reaches the first water level. During regular steam production steam exits the heating chamber through the steam outlet and water level in the heating chamber is varied between the third water level and the second water level, when water level drops to the second water level, the heating chamber control system operates such that water flows into the heating chamber through the water inlet at a refill flow rate slow enough to enable continued generation of steam until water level again rises to the third water level.

DETAILED DESCRIPTION

Figure 1:
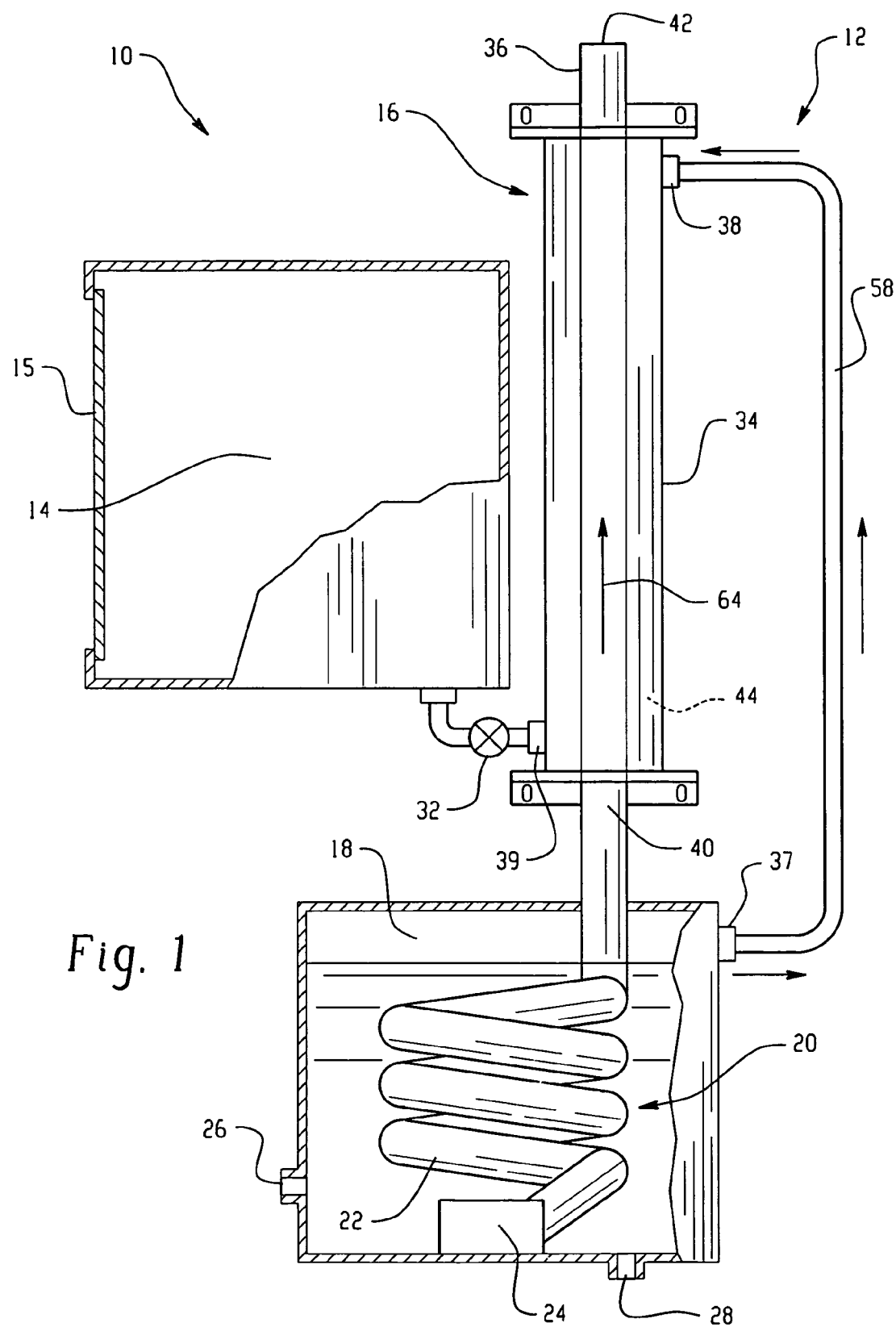
FIG. 1 is side schematic of one embodiment of a steam cooker.

Referring to FIG. 1, a low-pressure steam cooker 10 includes a steam generator 12 for generating steam and a cooking chamber 14 that is in communication with the steam generator. The cooking chamber 14 may be formed by an insulated housing and includes a door 15 movable between open and closed conditions. The steam generator 12 includes a heating chamber 18 where water is heated to generate steam and a steam superheater 16 capable of superheating the steam generated in the heating chamber.

Disposed within the heating chamber or boiler 18 of the illustrated embodiment is a gas heat exchanger 20 in the form of a submerged heat exchange tube having a helical portion 22. The heat exchanger 20 is connected to a burner unit 24 (e.g., a metal fiber, fan-driven burner having a stainless steel mesh and stainless steel tube, such as a Model BCT0027, available from N.V. Acotech S.A., Kennesaw, Ga.) that is capable of generating hot gases for delivery to the heat exchanger. Heat exchanger 20 is located in the heating chamber 18 such that it can be in a heat exchange relationship with water contained therein. While the illustrated heat exchange relationship with the water is via submersion of the heat exchanger, it is possible that hot gas could pass through ducts that are not submerged, such as ducts that run along the exterior wall of the heating chamber 18. Further another heating arrangement could be provided, such as an electrical resistance heater within or on the side(s) of the tank. The heating chamber 18 includes an inlet 26 for ingress of water into the heating chamber from a water source and an outlet 28 for egress of water from the heating chamber (as when the chamber is to be drained).

Outlet 37 leads to steam superheater 16, which includes an outer tube 34 and an inner tube 36 disposed within the outer tube. Outer tube 34 includes an inlet coupling 38 associated with the steam outlet 37 of the heating chamber 18 and an outlet coupling 39 associated with the cooking chamber 14. Inner tube 36 includes a gas inlet 40 connected to the heat exchanger 20 and an exhaust outlet 42 for the venting of combustion gases. As steam travels along the annular space between outer tube 34 and inner tube 36, heat from the combustion gases traveling through the inner tube 36 is transferred through the surface of the tube to the steam in order to superheat the steam. Disposed between the steam superheater 16 and cooking chamber 14 is a valve 32 that controls the flow rate of superheated steam into the cooking chamber (in some embodiments, the flow rate of superheated steam from steam superheater 16 into the cooking chamber is between about 35 and about 90 pounds per hour, such as about 50 pounds per hour where the volume of the cooking chamber is between about 164 and 245 cubic inches).

Figure 2:
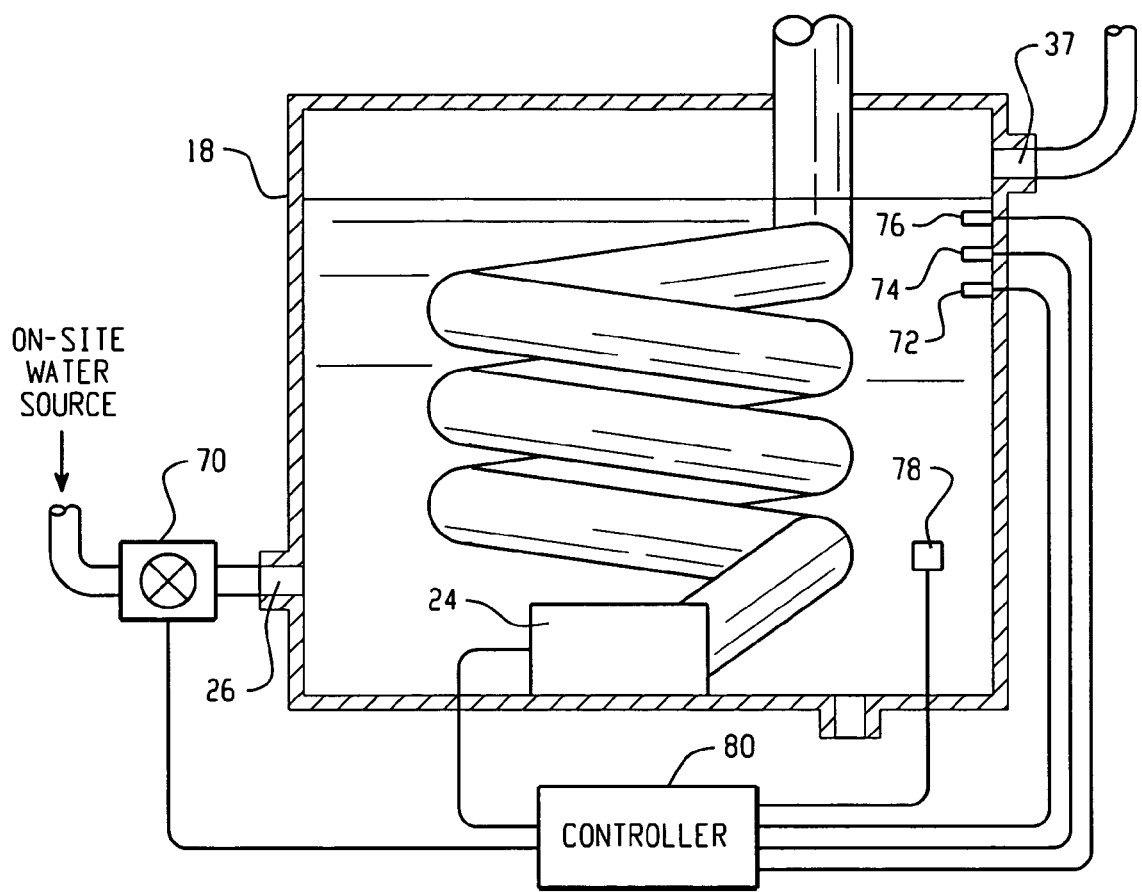
FIG. 2 is a schematic view of one embodiment of a heating chamber/boiler and associated control arrangement.

Referring now to FIG. 2, one embodiment of a water fill process for heating chamber 18 is now described. A flow control mechanism 70 is shown in association with the inlet 26. Three water level sensors 72, 74 and 76 are also provided in the illustrated embodiment, along with a water temperature sensor 78. The sensors may be within the main heating chamber as shown, or could be contained in a housing unit that is placed alongside the main heating chamber and includes a path of fluid communication with the heating chamber (as might be provided by tubing). Mechanism 70, level sensors 72, 74, and 76 and temperature sensor 78 are connected with a controller 80, and the controller 80 is also connected to control the operation of the burner unit 24 or other heating unit to provide a heating chamber control system that, in one implementation, operates as follows. During an initial fill operation of the heating chamber 18 (such as when the steamer is turned on in the morning), device 70 is controlled such that water initially flows into the heating chamber through water inlet 26 at a first flow rate until water level in the heating chamber rises to a first set water level at which point water flow into the heating chamber is stopped. When water temperature reaches a set temperature, as indicated by temperature sensor 78, water again flows into the heating chamber through the water inlet 26 at a second flow rate that is lower than the first flow rate until a second, higher set water level is reached. Use of the second, slower flow rate can help reduce the impact that incoming water has on the temperature of the water that has already been heated to the set temperature.

Where the first set water level and second set water level are sufficiently close, the water level may reach the second set water level merely by expansion of the water volume due to heating to the set temperature, in which case additional water flow after the water reaches the set temperature might not necessary. In such an embodiment the technique basically involves the control of water flow during initial fill based upon the temperature of the water (e.g, in the specific embodiment when the water temperature is below the set temperature, incoming water flow is controlled (e.g., stopped or restricted) to prevent the water from rising all the way to the second, higher water level until the temperature of the water rises to or approaches the set temperature).

In one implementation: (i) the first set water level is between about 0.5 inches and 1.0 inches below; the second set water level; (ii) the second flow rate is no more than about ⅕ the first flow rate, or no more than about ⅒ the first flow rate; and (iii) the set temperature is at least 190° F., or at least 198° F.

In one example, the first set water level is a water level indicated by level senor 72 and the second set water level is indicated by level sensor 76. In this manner, undesired water volume expansion to levels too far above the high level sensor 76 may be avoided by assuring that a substantial majority (i.e., at least 75%) of water volume expansion due to temperature increase occurs before the water level ever reaches the high level sensor 76. This result may be particularly useful in heating chambers where the high level sensor 76, which represents an operating water level, is located close to the steam outlet 37 because it can help to reduce or avoid liquid water entering the steam outlet 37, either as droplets carried with the steam or as a result of the water expansion itself, as liquid water entering the steam path can result in increased maintenance requirements.

In one example, the controller 80 maintains the burner 24 or other heating unit off until the first set water level is reached, but it is possible some heating could occur before the first set water level is reached. Where the low level sensor 72 acts as a safety, the controller 80 will typically prevent any operation of the burner unit 24 or other heating unit whenever the water level is below sensor 72.

During normal steaming operations, as steam exits the heating chamber through the steam outlet 37, the water level in the heating chamber drops. When the water level drops to a third set water level, which is between the first set water level and the second set water level, as reflected by middle level senor 74, the device 70 is controlled such that water again flows into the heating chamber through the water inlet 26 at a refill flow rate slow enough to enable continued generation of steam until the water level again rises to the second set water level reflected by high level sensor 76. In one example the refill flow rate is the same as the second flow rate mentioned above.

Figure 3:
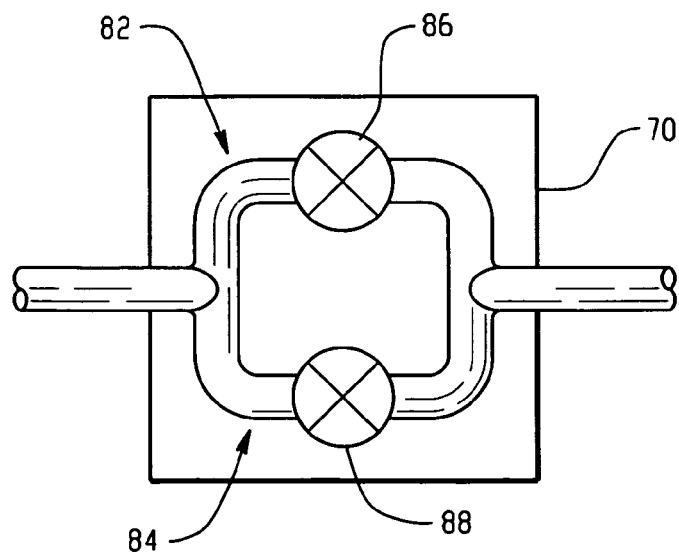
FIG. 3 is a schematic view of one embodiment of a flow control device.

In one implementation, flow control device 70 may be a valve that can be energized at different levels in order to provide for different water flow rates. In another implementation, as shown in FIG. 3, the flow control device 70 may include multiple flow paths 82, 84 and multiple valves 86, 88 for enabling selective control of each flow path. The valves 86 and 88 can be sized to provide different flow rates when opened. Assuming valve 86 provides a lower flow rate than valve 88, such an arrangement potentially enables four different flow rates, namely (1) no flow when both valves 86 and 88 are closed, (2) a lowest flow rate when only valve 86 is opened, (3) a middle flow rate when only valve 88 is opened, and (4) a highest flow rate when both valves 86 and 88 are opened.

It is to be clearly understood that the above description is intended by way of illustration and example only and is not intended to be taken by way of limitation. For example, while the illustrated steam cooker includes a superheater along the path from the heating chamber to the steam cooking chamber, it is recognized that steam cookers without superheating technology could utilize the heating chamber/boiler fill process described herein. Further, while certain embodiments are described, it is recognized that other variations on the control of water inflow to the heating chamber based at least in part upon temperature are possible. Other changes and modifications could be made.

What is claimed is:

1. A steam cooker comprising:
   a heating chamber defining a volume for holding water, the heating chamber including a water inlet and a steam outlet;
   a heating unit associated with the heating chamber in order to heat water in the heating chamber so as to generate steam;
   a steam cooking chamber formed by an insulated housing and having a door moveable between opened and closed positions;

a steam path from the steam outlet to a steam cooking chamber;

a heating chamber control system associated with the heating chamber for controlling water filling and heating operations of the heating chamber in order to generate steam for a cooking operation, the heating chamber control system includes a controller that operates to carry out an initial fill operation of the heating chamber such that
  (a) water flows into the heating chamber through the water inlet at a first flow rate until water level in the heating chamber rises to a first set water level at which point water flow into the heating chamber is stopped so long as water temperature is less than a set temperature; and
  (b) when water temperature reaches the set temperature, water flows into the heating chamber through the water inlet until a second set water level is reached at which point water flow into the heating chamber is stopped, the second set water level being spaced vertically from the steam outlet to inhibit liquid water from entering the steam outlet.

2. The steam cooker of claim 1 wherein the controller operates such that, during the initial fill operation, the water flow into the heating chamber is stopped when water level in the heating chamber rises to the first set water level and when water temperature reaches the set temperature water again flows into the heating chamber through the water inlet at a second flow rate that is lower than the first flow rate until the second set water level is reached at which point water flow into the heating chamber is stopped.

3. The steam cooker of claim 2 wherein the first set water level is between about 0.5 inches and 1.0 inches below the second set water level.

4. The steam cooker of claim 2 wherein the second flow rate is no more than about ⅕ the first flow rate.

5. The steam cooker of claim 4 wherein the second flow rate is no more than about ¹⁄₁₀ the first flow rate.

6. The steam cooker of claim 2 wherein as steam exits the heating chamber through the steam outlet water level in the heating chamber drops, when water level drops to a third set water level, which is between the first set water level and the second set water level, the controller operates such that water flows into the heating chamber through the water inlet at a refill flow rate slow enough to enable continued generation of steam until water level again rises to the second set water level.

7. The steam cooker of claim 6 wherein the refill flow rate is the same as the second flow rate.

8. The steam cooker of claim 2 wherein the set temperature is at least 190° F.

9. The steam cook er of claim 8 wherein the set temperature is at least 198° F.

10. The steam cooker of claim 2 wherein the controller operates to turn on the heating unit when water level in the heating chamber rises to the first set water level.

11. The steam cooker of claim 2 wherein the heating chamber control system includes at least one controllable valve associated with the water inlet, at least one temperature sensor for detecting water temperature in the heating chamber, a first water level sensor for detecting the first set water level, a second water level sensor for detecting the second set water level and a controller connected with each of the valve, temperature sensor, first water level sensor and second water level sensor.

12. A steam cooker comprising:
  a heating chamber defining a volume for holding water, the heating chamber including a water inlet and a steam outlet;
  a heating unit associated with the heating chamber in order to heat water in the heating chamber so as to generate steam;
  a steam cooking chamber formed by an insulated housing and having a door moveable between opened and closed positions;
  a steam path from the steam outlet to the steam cooking chamber;
  a heating chamber control system associated with the heating chamber for controlling water filling and heating operations of the heating chamber, during normal steaming operations water level varies between a higher level and a lower level in accordance with steam exiting the heating chamber and replacement water being added back to the heating chamber, the higher level below the steam outlet,
  the heating chamber control system including a controller that operates
    (i) to carry out an initial fill operation of the heating chamber so as to (a) prevent water level in the tank from rising to the higher level until temperature of the water rises to a set temperature during the initial fill operation and (b) control water flow into the tank and heating of the water during the initial fill operation so that a substantial majority of water volume expansion due to temperature increase occurs prior to water level in the tank reaching the higher level; and
    (ii) to subsequently maintain water level in the heating chamber at or below the higher level.

13. The steam cooker of claim 12 wherein the heating chamber control system includes a temperature sensor for detecting when water temperature reaches the set temperature at which the substantial majority of water volume expansion due to temperature increase will have occurred.

14. The steam cooker of claim 12 wherein the heating chamber control system includes a timer, after water level in the heating chamber initially rises to a first water level inflow of water is stopped and water is heated for a certain time period corresponding to the set temperature at which the substantial majority of water volume expansion due to temperature increase will have occurred.

15. The steam cooker of claim 12 wherein the heating chamber control system includes at least one controllable valve associated with the water inlet, at least one temperature sensor for detecting water temperature in the heating chamber, a first water level sensor for detecting a first set water level, a second water level sensor for detecting the higher level and a controller connected with each of the valve, temperature sensor, first water level sensor and second water level sensor.

16. A steam cooker comprising:
  a heating chamber defining a volume for holding water, the heating chamber including a water inlet and a steam outlet;
  a heating unit associated with the heating chamber in order to heat water in the heating chamber so as to generate steam;
  a steam cooking chamber formed by an insulated housing and having a door moveable between opened and closed positions;
  a steam path from the steam outlet to the steam cooking chamber;

a heating chamber control system associated with the heating chamber for controlling water filling and heating operations of the heating chamber, during normal steaming operations water level varies between a higher level and a lower level in accordance with steam exiting the heating chamber and replacement water being added back to the heating chamber, the higher level below the steam outlet, the heating chamber control system includes a controller that operates to carry out an initial fill operation of the heating chamber by controlling water flow into the tank and heating of the water during an initial fill operation of the heating chamber so that when the water level initially reaches the higher level a temperature of the water is at least 190° F. and once the initial fill operation is completed the controller operates to prevent the water level from reaching the steam outlet.

* * * * *